Feb. 23, 1971  R. H. RINGSTAD  3,566,250
TIME ERROR CORRECTOR FOR AUTOMATICALLY MAINTAINING
AVERAGE FREQUENCY OF A.C. SOURCE CONSTANT
Filed Nov. 19, 1968  3 Sheets-Sheet 3
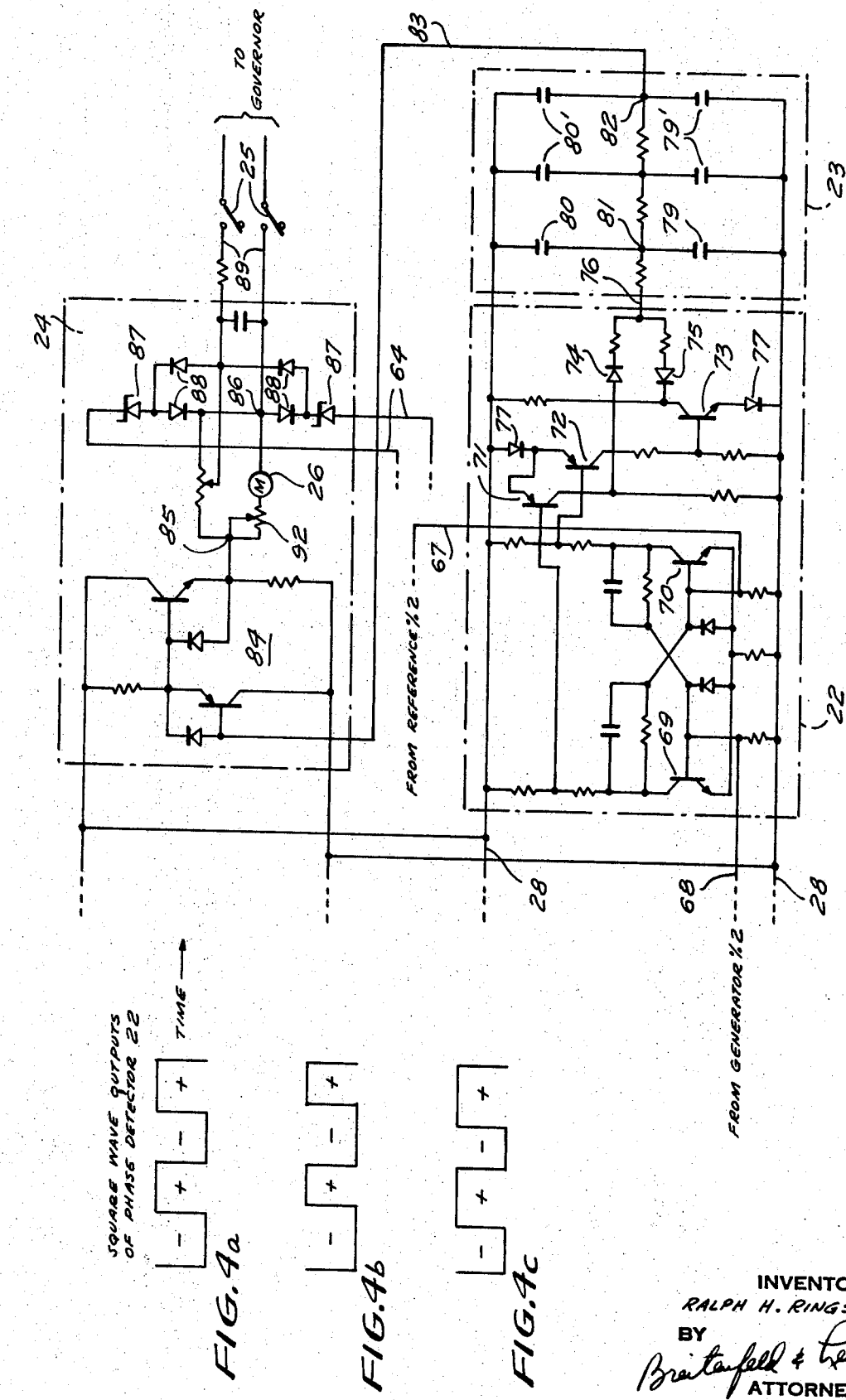
INVENTOR:
RALPH H. RINGSTAD
BY
ATTORNEYS United States Patent Office 3,566,250
Patented Feb. 23, 1971

3,566,250
TIME ERROR CORRECTOR FOR AUTOMATI-
CALLY MAINTAINING AVERAGE FREQUENCY
OF A.C. SOURCE CONSTANT
Ralph H. Ringstad, Whippany, N.J., assignor to Automatic Switch Co., a corporation of New York
Filed Nov. 19, 1968, Ser. No. 780,309
Int. Cl. H02p 9/04
U.S. Cl. 322—32                                    10 Claims

ABSTRACT OF THE DISCLOSURE

A means having a fixed frequency of oscillation is provided, and a first series of pulses is produced having a certain timed relationship to the frequency of oscillation. A second series of pulses is produced having the same timed relationship to the frequency of the power source. A phase detector compares the two series of pulses and produces a square wave signal which is fed to an integrator. The latter produces a D.C. signal proportional to the difference in frequencies between the two series of pulses. Integrator signal compared to a signal of fixed magnitude, and difference between them, if any, produces signal for controlling governor which alters speed of prime mover, and hence generator comprising the power source, in a way to maintain average frequency of power source constant.

---

This invention relates to alternating current power generating installations, and more particularly to a system associated with such an installation for maintaining the average frequency of the A.C. power constant.

The importance of maintaining average frequency constant will be appreciated if it is considered that most electric clocks in use at present are driven by so-called synchronous motors. These motors are designed to rotate in step with the frequency of the A.C. power energizing them, regardless of minor variations in voltage. Thus, if an electric clock is to keep accurate time, the average speed of its synchronous motor must be constant, and hence the average frequency of the power source to which it is connected must be maintained constant.

All electric power generating installations experience variations in the frequency of the power they produce, due for example to variations in the loads connected to them, as well as other factors. Large public electric power utilities meet this problem primarily by having personnel constantly supervise the installation and make adjustments to compensate for such variations. This technique is not suitable in the case of smaller localized generating installations which do not warrant full-time supervision by an attendant. Such installations may be standby power generators, which come into operation only when the public utility fails, or so-called total energy systems, which supply a single building, or complex of buildings such as a shopping center. In such cases, automatic means are called for to monitor the frequency and make compensatory corrections to maintain average frequency constant.

Such automatic correction arrangements are known, and usually employ a reference source, such as a spring actuated clock movement or an electronic frequency source. The output of the reference is applied, via suitable transmission means if necessary, to one input of a mechanical differential. A synchronous motor is connected to the generator power being monitored, and the motor output is applied to the other input of the mechanical differential. The output of the differential is used to rotate a potentiometer or switch which in turn influences the speed control governor of the prime mover operating the electric generator. If the frequencies of the reference source and generated power are equal, the output of the differential will be zero. However, if the generated power frequency rises above or falls below the reference frequency, the output from the differential will cause the governor to act so as to correct for the deviation.

A serious problem presented by these conventional arrangements involves their reliance on mechanical parts, such as the differential, the potentiometer or switch, and the transmissions, all of which are subject to wear, which adversely affects the accuracy of the corrections they make.

It is therefore an object of the present invention to provide a system for automatically maintaining the average frequency of an A.C. source constant, which employs no mechanical parts whatsoever, but instead relies completely on electronic components.

Toward this end, the invention employs a reference frequency source, such as an electronic oscillator. The output of the oscillator is converted to pulses, and the frequency of the pulses is reduced by a series of division circuits. Similarly, the generated A.C. power is converted to pulses, and the frequency of the pulses is reduced by another series of division circuits, so that ultimately two series of pulses are produced, i.e., the reference series and the generator series, both having the same frequency. The two series of pulses are applied to a phase detector which produces a square wave signal the shape of which depends upon the relationship of the frequencies of the two series of pulses. The output of the phase detector is applied to an integrator which produces a corresponding D.C. voltage, and this D.C. voltage is compared, in an output stage with a fixed D.C. voltage. The difference between these D.C. voltages is applied to the speed control governor of the prime mover. A clock having a synchronous motor may be connected to the generated power source to give a visual indication of average generator frequency, and for purposes of comparison, a second clock may be arranged for actuation by the oscillator, such as via a magnetic escapement employing a tuning fork.

Additional objects and features of the invention will be apparent from the following description in which reference is made to the accompanying drawings.

In the drawings:

FIG. 3 is a schematic diagram showing the phase detector, integrator, and output stage of FIG. 1; and FIGS. 4a, 4b, and 4c show illustrative square wave outputs of the phase detector.

Figure 1:
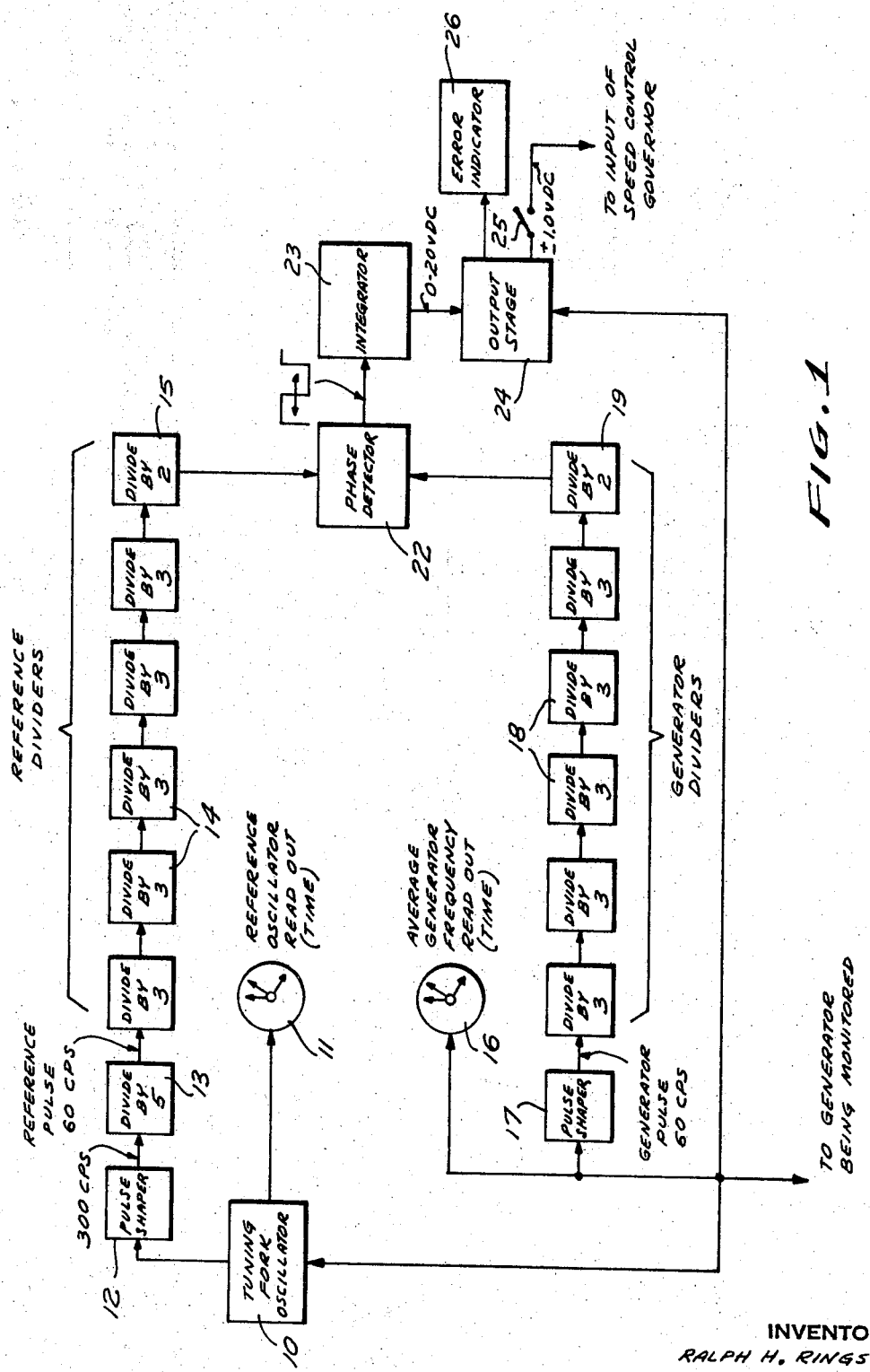
FIG. 1 is a block diagram of a system according to the present invention for maintaining the average frequency of an A.C. generator constant.

The system chosen to illustrate the present invention, and shown in FIG. 1, includes an oscillator 10 for producing a fixed frequency reference signal. While any suitable oscillator may be employed, it is advantageous to use the oscillator circuit forming part of a tuning fork clock movement sold under the trademark "Acrotyne" by the Seth Thomas Division of General Time Corporation. In this movement, the oscillator causes a tuning fork to vibrate at precisely 300 cycles per second (c.p.s.), and these vibrations are transmitted magnetically to a rotor arranged between the tines of the tuning fork. The rotary motion of the rotor drives the hands of a clock 11 via suitable reduction gearing. The clock 11 always gives a visual indication of the actual time, and it is the purpose of the invention to insure that all clocks energized by the generating system under control render the same indication. An advantage of using the Acrotyne movement stems from the fact that there is no mechaical connection between the tuning fork and the rotor. Hence, should the clock gearing malfunction, this will not affect the continued oscillation of the reference source at a fixed frequency.

The oscillator 10 is energized by power from the generator installation under control via suitable means (not shown in FIG. 1) for insuring that a constant voltage is applied to it. The output of the oscillator 10, which in the present example is a 300 c.p.s. alternating current signal, is applied to a pulse shaper 12 whereby the signal is converted to a series of 300 c.p.s. pulses. These pulses are fed to a "divide by five" counting circuit 13, which reduces their frequency by a factor of five, thereby producing a series of 60 c.p.s. pulses. Thess may be thought of as reference pulses against which the 60 c.p.s. generator power will be compared. It should be mentioned that although 60 c.p.s. power, standard in the United States, is referred to herein, the invention may obviously be used with generators producing power at any selected frequency.

To make the series of reference pulses more convenient for purposes of this invention, its frequency is further reduced by applying the 60 c.p.s. pulses to a series of five "divide by three" counting circuits 14, each of which produces an output having a frequency one-third as large as the frequency of the input, followed by a divide by two circuit 15. As a result, the 60 c.p.s. reference pulse is divided by a factor of 486 yielding a series of reference pulses at the output of divider 2 having a frequency of about 0.123 c.p.s., and a period between pulses of about 8.05 seconds. Obviously, the particular division circuits employed may be varied to yield any desired intervals between output pulses from circuit 15.

A standard electric clock 16, having a synchronous motor, is energized by power from the generator being monitored. The clock 16, which may be located alongside clock 11 for comparison purposes, gives a visual indication of the average generator frequency. Hence, viewing the clocks 11 and 16 will immediately indicate to an attendant whether the average generator frequency has been maintained at 60 c.p.s. Also connected to the power source being monitored is a pulse shaper 17 which produces a series of 60 c.p.s. pulses, assuming of course that the generator frequency is precisely 60 c.p.s. The series of generator pulses, which are to be compared to the reference pulses, are applied to a series of five divide by three counting circuits 18 and a divide by two circuit 19, whereby the generator pulses ultimately achieve a frequency equal to the frequency of the reference pulses leaving divide circuit 15.

The outputs of the divider circuits 15 and 19, i.e. the reference and generator pulses, respectively, are applied to a phase detector 22 adapted to generate a square wave output signal in response to the pulses. The phase detector is turned "on" by each generator pulse, and turned "off" by each reference pulse. Hence, if the interval between each generator pulse and the next succeeding reference pulse equals the interval between each reference pulse and the next succeeding generator pulse, each positive portion of the square wave output will be equal in duration to each alternate negative portion, as shown in FIG. 4a. On the other hand, if the generator power drops slightly below 60 c.p.s., the generator pulses will arrive at the phase detector 22 later than they would if the generator were operating at 60 c.p.s. As a result, the durations of the negative portions of the square wave output of the phase detector increase, and the durations of the positive portions decrease, as illustrated in FIG. 4b. Conversely, if the generator power rises above 60 c.p.s., the generator pulses arrive at the phase detector sooner, and hence the durations of the positive square wave portions increase, and the durations of the negative portions decrease, as shown in FIG. 4c.

The phase detector output is applied to an integrator 23 which converts it to a D.C. voltage whose magnitude depends upon the time relationship between the positive and negative portions of the square wave applied to it. Thus, if the square wave has positive and negative portions of equal duration, the integrator will produce a D.C. signal of, say, 10 volts. If the generator frequency drops below 60 c.p.s., so that the square wave has longer negative portions, the output of the integrator falls to a value below 10 volts. In contrast, should the generator frequency rise above 60 c.p.s., the square wave from phase detector 22 will have positive portions of longer duration, and the output signal from integrator 23 will be above 10 volts.

The output of the integrator 23 is applied to an output stage 24 which serves as an impedance amplifier for reducing the output impedance of the integrator. Furthermore, the magnitude of the integrator output is compared in the output stage to a fixed volage having a value equal to the value of the integrator output when the square wave output of the phase detector 22 has positive and negative portions of equal duration. Thus, in the present example, the fixed voltage within the output stage, which is derived from the power source being monitored, has a value of 10 volts. The output of integrator 23 is compared, within the output stage, to the fixed voltage, and a signal proportional to the difference between them is applied to the speed control governor for the generator prime mover, assuming the governor disconnect switch 25 is closed. The output signal of the output stage varies in both magnitude and polarity and hence is capable of causing the governor to increase or decrease the speed of the generator.

It will be appreciated that if the output from integrator 23 is 10 volts, there will be no difference between this output and the fixed voltage within the output stage, and hence no signal will be transmitted to the governor. However, if the integrator output is below 10 volts, a signal is sent by the output stage 24 to the governor calling for an increase in speed of the generator. On the other hand, if the integrator output is above 10 volts, a signal is transmitted from the output stage to the governor calling for a decrease in generator speed. An error detector 26, in the form of a meter, is provided for giving a visual indication of the voltage difference between the output of the integrator and the fixed voltage within the output stage. The reading on this meter, at any particular moment, indicates the instantaneous difference between the average generator frequency and the correct 60 c.p.s. frequency as defined by the reference source. Thus, should an attendant note that the time on clock 16 is earlier than the time on clock 11, indicating that the average generator frequency has been below 60 c.p.s., he can check the indicator 26 to be sure that at the moment the governor is being adjusted to run the generator at greater than 60 c.p.s. to make up for the low average frequency. Furthermore, it may happen that the clocks being energized by the generator do not reflect the accurate time, and yet each of the clocks 11 and 16 indicates precisely the same time as the other. Should this occur, it will be immediately apparent that there is no malfunction within the control system, since the clock 16 is being kept to precisely the same time as clock 11, but instead the reference source is not oscillating at precisely its rated frequency, in this case 300 c.p.s.

Figure 2:
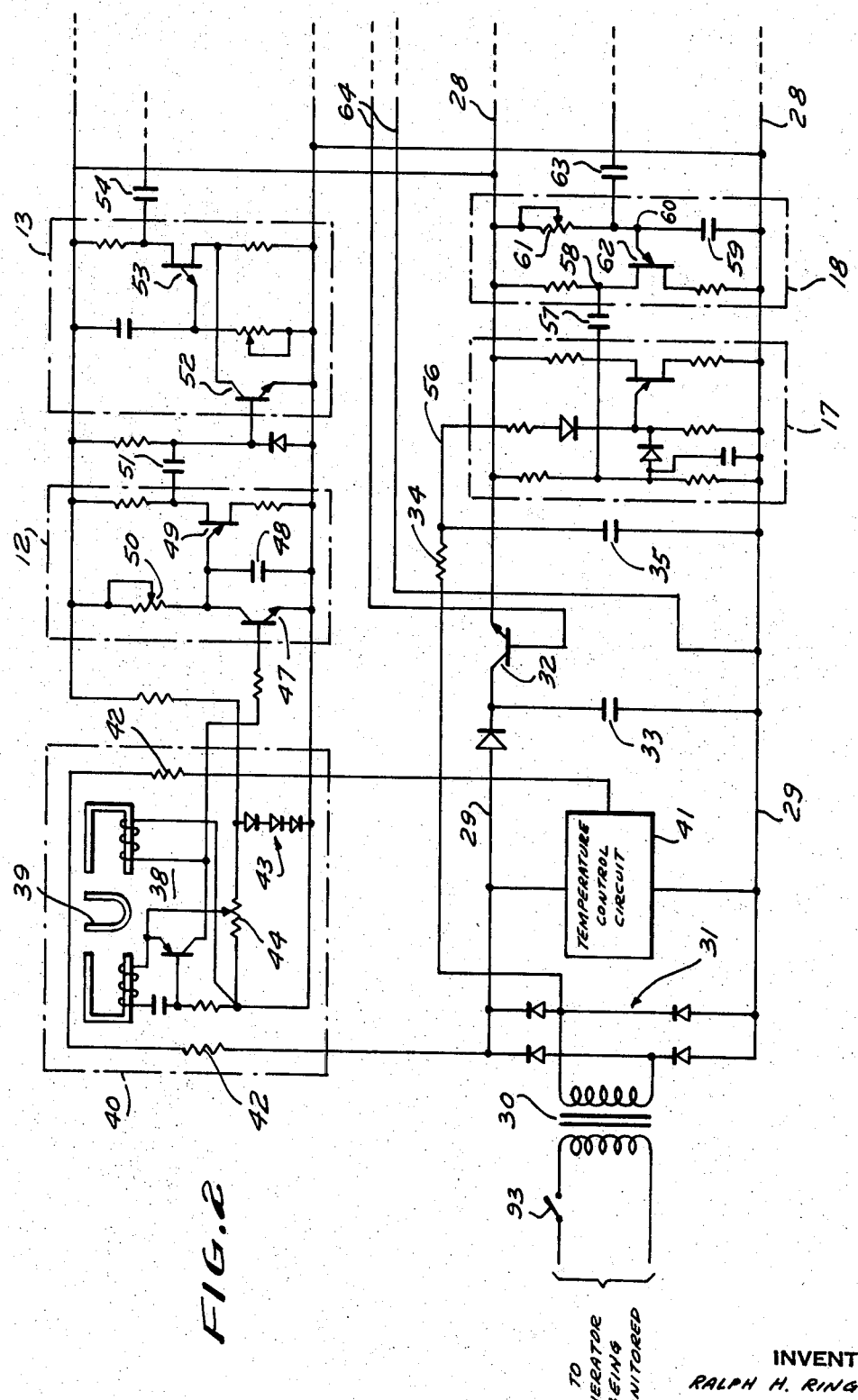
FIG. 2 is a schematic diagram showing the reference source, pulse shaper, and division circuits of FIG. 1.

The system described above with reference to FIG. 1 is shown in more detail in FIGS. 2 and 3. Power is supplied to the system, from the generator or generators being monitored, via a transformer 30, and a rectifier 31, which provide a potential across lines 29. The circuit also includes a D.C. filter capacitor 33, and a transistor 32 serving as a voltage regulator, to provide a constant D.C. potential of, say, 20 volts, across lines 28. In addition, resistor 34 and capacitor 35 constitute a low pass filter to make the unit less sensitive to line voltage transients.

The Acrotyne clock movement referred to above includes a transistor oscillator circuit 38 for vibrating a tuning fork 39. Since the rate at which any tuning fork vibrates is affected by changes in temperature, it is desirable to locate the clock movement within an enclosure or oven 40, and maintain the oven at a constant temperature, say 40° C., above which the ambient temperature is not likely to rise. Any suitable temperature control circuit 41 may be employed to heat the oven 40 by means of electric resistance heaters 42. The oscillator circuit is supplied with its required D.C. input, in this example 1.5 volts, via diodes 43. Since the frequency of the oscillator circuit will vary slightly with variations in voltage supplied to it, the diodes 43 are located within the oven 40. In this way, the voltage drop across the diodes is made insensitive to changes in ambient temperature. A potentiometer 44, having an external adjustment knob, permits the voltage supplied to the oscillator 38 to be adjusted so as to correct for gradual drifting of the reference clock 11 from the actual time, as determined from an outside source. The rotor and gearing driven by the tuning fork 39 have not been illustrated.

The output signal of the oscillator 38 is applied to the base of an amplifier transistor 47 forming part of the pulse shaper 12. The amplified signal, having a square waveform, serves to charge capacitor 48 causing unijunction transistor 49 to fire 300 times a second. Potentiometer 50 permits the charging rate of capacitor 48 to be adjusted. The 300 c.p.s. series of pulses leaves the pulse shaper 12 via coupling capacitor 51, and is applied to the base of a transistor 52 forming part of the divide by five counting circuit 13. 60 pulses per second leave the circuit 13 and are applied, via coupling capacitor 54, to the first of the series of divide by three circuits 14, not shown in FIG. 2. The operation of the divider circuits will be described below with respect to a divide by three circuit. However, it should be mentioned that, whereas all the other divider circuits of the present arrangement employ only a single unijunction transistor, the circuit 13 employs transistor 52 in addition to a complementary type unijunction transistor 53. Complementary type unijunction transistors now available are more stable than the ordinary type, and increased stability is needed in circuit 13 since it is dividing by five rather than only three or two.

A signal carrying the generator frequency is applied via conductor 56 to the pulse shaper 17, which performs in much the same way as pulse shaper 12, to deliver via capacitor 57 a series of negative pulses, having a frequency equal to the generator frequency, to the first divide by three circuit 18. While each negative pulse is being applied to junction 58 of circuit 18, capacitor 59 is charging causing the voltage at junction 60 to increase in an exponential fashion. The values of capacitor 59 and resistor 61 are so chosen (the resistance value being adjustable) that ordinarily the voltage at junction 60 would rise above the internal voltage reference level within unijunction transistor 62 only after more than three pulses are applied to capacitor 59. However, as each negative pulse arrives at junction 58, the voltage at this junction momentarily decreases so that when the third negative pulse from capacitor 57 arrives, the voltage at junction 60 now exceeds the, momentarily reduced, internal voltage reference level of transistor 62. Consequently, the transistor 62 fires creating a negative pulse at coupling capacitor 63 for delivery to the next divide by three circuit, not shown in FIG. 2. All the divider circuits operate in substantially the same manner as just described.

Two conductros 64 are connected to Zener diodes 87 which regulate the voltage of the system, in this example 20 volts. The Zener diodes are shown in the output stage 24, in FIG. 3. FIG. 3 also shows the phase detector 22 which receives positive reference pulses from circuit 15 along conductor 67 and positive generator pulses from circuit 19 along conductor 68. The transistors 69 and 70 of the phase detector are arranged in well-known fashion so that when one turns on, the other turns off, and vice versa. Specifically, when a reference pulse is applied to the base of transistor 70, this transistor turns on and transistor 69 turns off. Conversely, when a generator pulse is applied to the base of transistor 69, this transistor turns on and transistor 70 turns off. The transistors 69 and 70 operate as the square wave generator portion of the phase detector. Also included in the phase detector are transistors 71, 72, and 73. When transistor 69 turns on, transistor 70 turns off, transistor 71 turns on, transistor 72 turn off, and transistor 73 turns off. As a result, diode 74 is forward biased (diode 75 is reversed biased) yielding a maximum voltage signal of, say, 20 volts at line 76 which connects the phase detector 22 to the integrator 23. When transistor 70 turns on, transistor 69 turns off, transistor 71 turns off, transistor 72 turns on, and transistor 73 turns on. Consequently, diode 75 becomes forward biased (diode 74 reverse biased) and a minimum signal of, say, zero volts appears at line 76. It might be mentioned that since the voltage drops across transistors 71 and 73 are about equal, and the voltage drops across diodes 74, 75 and 77 are about equal, the change which these drops experience with variations in ambient temperature are of the same degree and hence errors due to temperature variations are minimized.

The square wave output of the phase detector 22 enters the integrator 23, which includes six capacitors all of equal value, and three resistors all of equal value. During the positive portions of the square wave, capacitor 79 charges toward 20 volts, and capacitor 80 discharges toward zero volts. Consequently, the voltage at junction 81 rises gradually toward 20 volts. During the negative portions of the square wave, capacitor 79 discharges toward zero volts and capacitor 80 charges toward 20 volts. As a result, the voltage at junction 81 decreases gradually toward zero volts. Capacitors 79' and 80' react similarly and serve to smooth out the voltage variations at junction 81, so that a steady D.C. voltage appears at junction 82. If the positive and negative portions of the square wave are of equal duration, the voltage at junction 82 will be, in the present example, 10 volts.

The voltage at junction 82 is transmitted, via conductor 83, to a two stage emitter follower portion 84 of output stage 24. The emitter follower decreases the output impedance of the integrator without affecting its output voltage. Thus, when the average frequency of the generator has been 60 c.p.s., a 10 volt D.C. signal is applied to junction 85. A fixed comparison voltage of 10 volts is constantly maintained at junction 86 by Zener diodes 87 and diodes 88, supplied by conductors 64. The output to the governor, along conductors 89, is the difference between the voltage applied to junction 85 and the fixed voltage of 10 volts at junction 86. If no difference appears between the voltages at junctions 85 and 86, obviously no signal is applied to the input of the governor, which may be a Woodward electric type EG governor, and the generators continue to rotate without changing speed. As shown, the arrangement is intended to limit the output voltage from the output stage to plus or minus one volt, because this is the maximum permitted input voltage range to this particular Woodward governor. However, other variations in output voltage are, of course, possible depending upon the type of governor used, be it either electric or hydraulic.

The error indicator meter 26 is connected across the junctions 85 and 86, and is provided with a calibration adjustment 92. The meter 26 can be calibrated to read the instantaneous error, i.e. time lag or lead of the generator frequency with respect to reference frequency, in seconds, since there is a definite relationship between voltage and time between pulses.

When the generator drops below 60 c.p.s., transistor 69 turns on later than when the generator is operating at 60 c.p.s. Hence, transistor 71 turns on later, diode 74 becomes forward biased later, and output of integrator 23 drops below 10 volts. This output at junction 85 is compared to the 10 volt comparison voltage, and a resulting signal is transmitted to the governor, causing it to increase slightly the speed of the generator. The governor itself will, of course, increase the speed of the prime mover to 60 c.p.s., even without the present invention. However, such action alone is not sufficient since the average long term frequency of the generator would have still remained below 60 c.p.s. For this reason, the present system causes the governor to temporarily increase the speed of the generator to slightly above 60 c.p.s. until the generator and reference pulses are again in step, indicating that the average long term generator frequency has returned to 60 c.p.s. as determined by the reference source.

To initiate operation of the present system, the system is first connected to the generator output by switch 93 (FIG. 2). After a short time lapse, an error will appear on the meter 26. The governor is now manipulated to change the speed of the generator so as to eliminate the error. In effect the governor is being set to precisely 60 c.p.s. and also, each generator pulse is now set exactly between each two successive reference pulses. Now, governor disconnect switch 25 is closed, and reference clock 11 is set to the exact time. Generator clock 16 is then set to match the reference clock.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A system for maintaining the average frequency of an alternating current power source equal to a preselected frequency, the generator producing the power being driven by a prime mover furnished with a speed control governor, the system comprising:
    (a) means for producing a continuous series of pulses having a timed relationship to the preselected frequency;
    (b) means connected to the power source for producing a continuous series of pulses having the same timed relationship to the frequency of the power source;
    (c) means for receiving both of said series of pulses and producing a signal proportional to the difference in frequencies between said two series of pulses; and
    (d) means responsive to said signal from means (c) for providing a signal to the governor so as to vary the speed of the prime mover and hence the generator and thereby correct for any difference in frequencies between said two series of pulses;
    said means (a) including
    (e) means for producing an alternating current signal of predetermined frequency independent of the frequency of the power source; and
    (f) means between said means (e) and said means (c) for reducing the frequency of the series of pulses produced my means (a);
    and said means (b) including
    (g) means between the power source and said means (c) for reducing the frequency of the series of pulses produced by means (b);
    said frequency reducing means (f) and (g) being such that when the frequency of the power source equals said preselected frequency, the frequencies of said two series of pulses are so related that means (d) causes the governor to produce no change in speed of the prime mover.

2. A system as defined in claim 1 wherein said last-named means includes a tuning fork, and an electric circuit associated with said tuning fork for causing the latter to oscillate at a fixed frequency.

3. A system as defined in claim 2 including an enclosure for said tuning fork, and means for maintaining the temperature with said enclosure constant.

4. A system as defined in claim 1 including means for adjusting as desired the predetermined frequency of the signal produced by means (e).

5. A system as defined in claim 1 including an electric clock connected to said power source, and a reference clock including a mechanism driven by said means (e).

6. A system as defined in claim 1 wherein the signal produced by said means (c) is a D.C. signal, and wherein means (d) includes means for providing a D.C. signal of constant value equal in magnitude to said signal from means (c) when the frequency of the source equals the preselected frequency, the signal provided by said means (d) being a D.C. signal proportional to the difference in magnitude between said two D.C. signals.

7. A system as defined in claim 6 including a meter for rendering a visual indication of the difference in magnitude between said two D.C. signals.

8. A system as defined in claim 6 wherein the magnitude of the D.C. signal produced by said means (c) changes in one direction when the relationship between the frequencies of the two series of pulses indicates the frequency of the source is greater than the preselected frequency, and changes in the other direction when the frequency of the source is less than the preselected frequency, whereby the polarity of the signal provided by means (d) depends upon whether the frequency of the source is greater or less than the preselected frequency.

9. A system as defined in claim 1 wherein said means (c) includes a phase detector for producing a square wave signal having alternate positive and negative durations, one of said durations being proportional to interval between each pulse from means (a) and the next successive pulse from means (b), and the other of said durations being proportional to the interval between each pulse from means (b) and the next successive pulse from means (a).

10. A system as defined in claim 9 wherein said means (c) also includes an integrator responsive to the square wave signal from said phase detector for producing said signal provided by means (c).

References Cited
UNITED STATES PATENTS

| | | | |
|---|---|---|---|
| 2,528,111 | 10/1950 | Buckthal | 322—61 |
| 2,703,862 | 3/1955 | Gordon | 322—32 |
| 2,943,257 | 6/1960 | Jacobson et al. | 322—32X |
| 3,082,353 | 3/1963 | Cohen et al. | 290—40X |
| 3,164,769 | 1/1965 | Anderson | 322—32 |
| 3,171,966 | 3/1965 | Bergslien et al. | 322—32 |
| 3,349,308 | 10/1967 | Strand | 318—341X |

ORIS L. RADER, Primary Examiner

H. HUBERFELD, Assistant Examiner

U.S. Cl. X.R.

290—40; 322—38